United States Patent [19]
Wehrmacher

[11] Patent Number: 4,522,456
[45] Date of Patent: Jun. 11, 1985

[54] ELECTRONIC TAG RECEPTACLE AND READER

[75] Inventor: William H. Wehrmacher, Prior Lake, Minn.

[73] Assignee: Datakey, Inc., Burnsville, Minn.

[21] Appl. No.: 573,649

[22] Filed: Jan. 25, 1984

[51] Int. Cl.³ .............................................. H01R 13/62
[52] U.S. Cl. ............................... 339/17 R; 339/17 F; 339/75 MP
[58] Field of Search ................. 339/17 R, 17 L, 75 R, 339/75 M, 75 MP, 17 F

[56] References Cited

U.S. PATENT DOCUMENTS

| | | | |
|---|---|---|---|
| 3,544,769 | 12/1970 | Hedin | 235/61.9 |
| 3,641,315 | 2/1972 | Nagata et al. | 235/61.7 B |
| 3,641,498 | 2/1972 | Hedin | 340/164 R |
| 3,648,020 | 3/1972 | Tateisi | 235/61.7 B |
| 3,651,464 | 3/1972 | Hedin et al. | 340/149 R |
| 3,673,467 | 6/1972 | Eisenreich | 317/134 |
| 3,694,810 | 9/1972 | Mullens et al. | 340/149 R |
| 3,848,229 | 11/1974 | Perron et al. | 340/149 A |
| 3,859,634 | 1/1975 | Perron et al. | 340/149 A |
| 3,971,916 | 7/1976 | Moreno | 235/61.7 B |
| 4,211,919 | 7/1980 | Ugon | 235/487 |
| 4,297,569 | 10/1981 | Flies | 235/443 |
| 4,317,957 | 3/1982 | Sendrow | 178/22.08 |
| 4,326,125 | 4/1982 | Flies | 235/443 |
| 4,355,856 | 10/1982 | Porter | 339/75 MP |
| 4,379,966 | 4/1983 | Flies | 235/443 |
| 4,436,993 | 3/1984 | Flies | 235/382 |
| 4,448,466 | 5/1984 | Porter | 339/75 MP |
| 4,461,524 | 7/1984 | Griffin | 339/75 M |
| 4,466,680 | 8/1984 | Sakai et al. | 339/75 M |

FOREIGN PATENT DOCUMENTS

| | | |
|---|---|---|
| 2363837 | 3/1978 | France . |
| 639056 | 12/1978 | U.S.S.R. ........ 339/75 MP |

OTHER PUBLICATIONS

"Spring Designers Offer New Formulas" from *Product Engineering*, Jul., 1978, pp. 49–54.

*Primary Examiner*—John McQuade
*Attorney, Agent, or Firm*—Vidas & Arrett

[57] ABSTRACT

Electrical receptacle for establishing electrical contact with an electronic tag insertion device of the type having electrical contacts and designed for bayonet-type insertion into the receptacle. The tags preferably contain a microelectronic circuit element such as a microelectronic chip and are designed to interface with a processor and program memory system, i.e., a computer by means of contacts in the receptacle whereby the receptacle enables the information stored in the key to be read and supplemented or amended.

29 Claims, 10 Drawing Figures

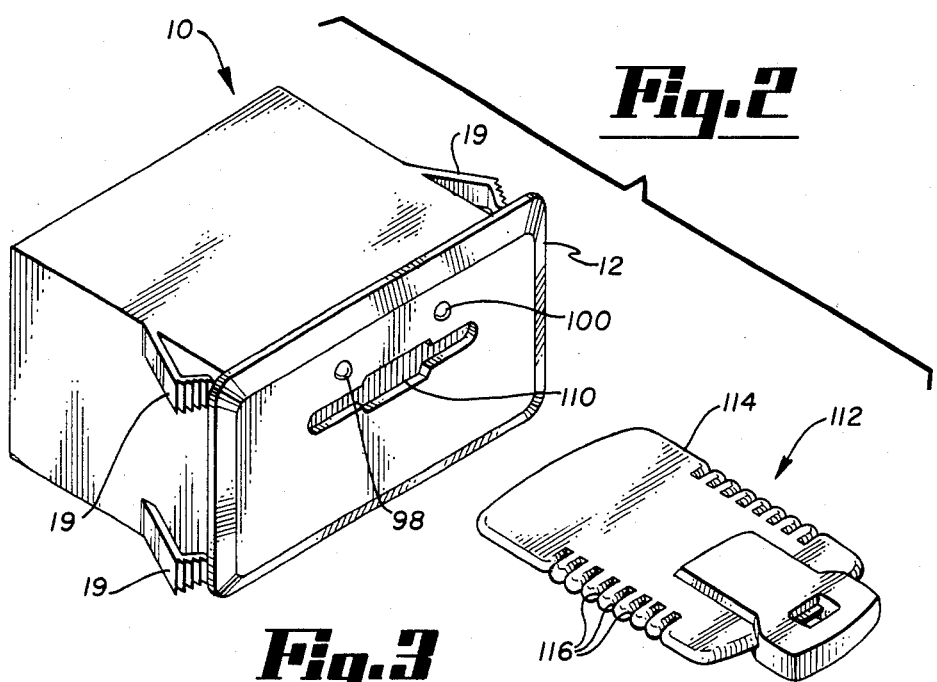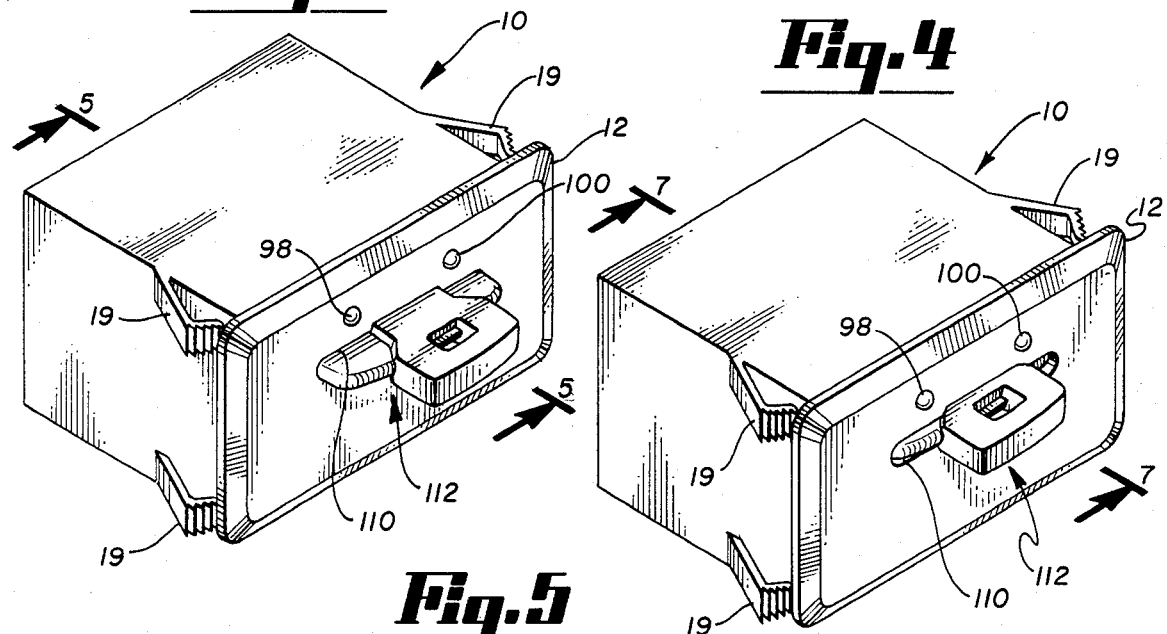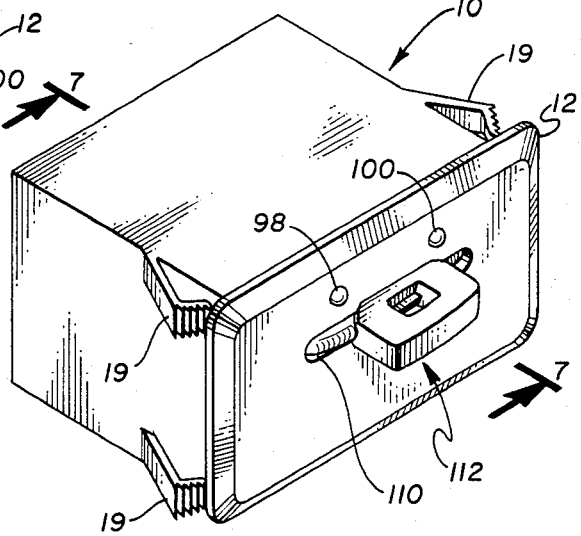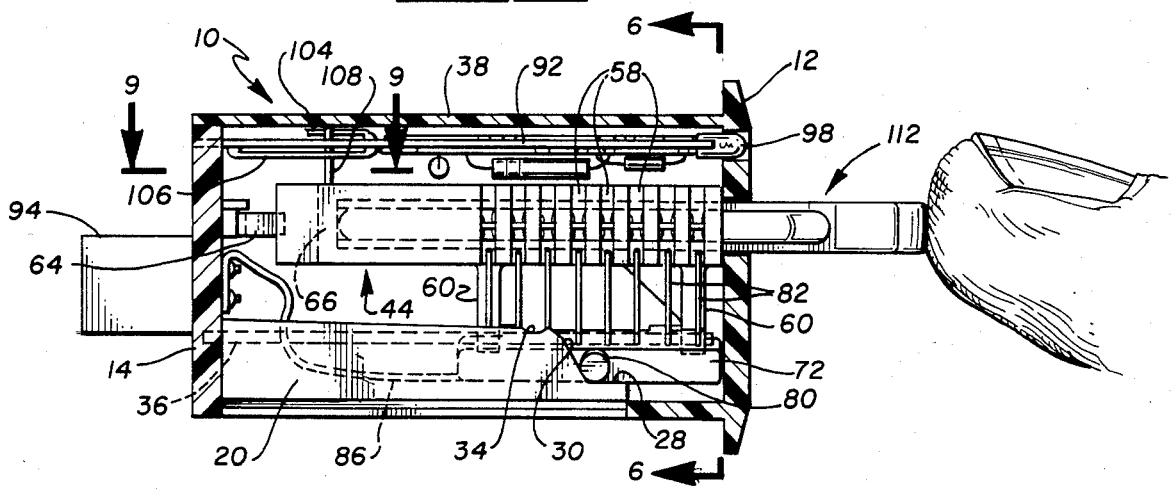

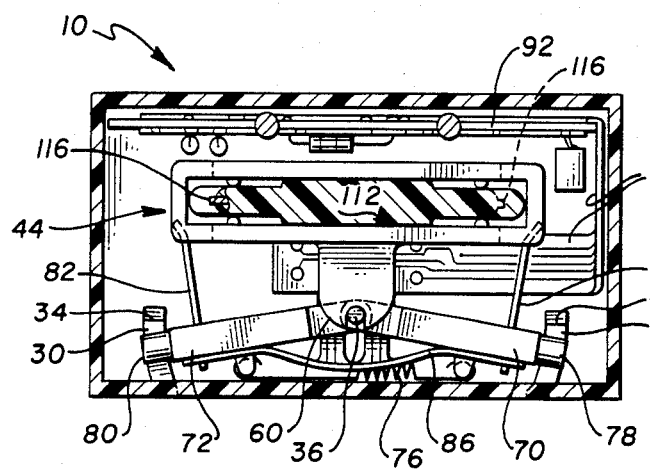
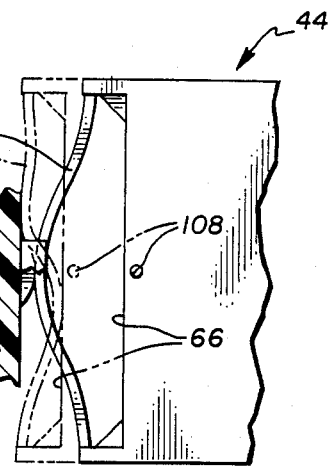
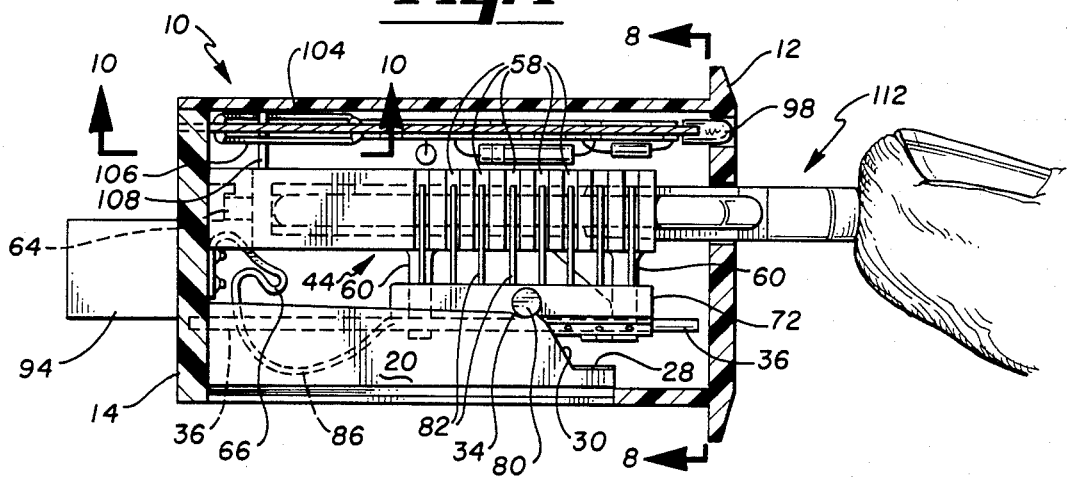
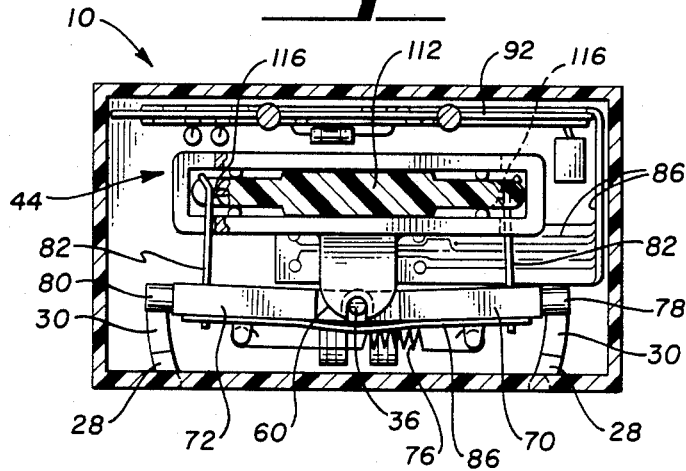
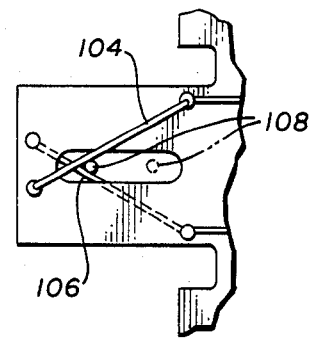

ELECTRONIC TAG RECEPTACLE AND READER

BACKGROUND OF THE INVENTION

Electrical devices of various types have been proposed in which a master circuit or electrical operating system of some kind, such as a computer system, is activated by use of a portable device that is designed to cooperate, coact or to be combined with the electrical system, as by insertion into a slot or the like which is designed to receive the device. U.S. Pat. No. 4,297,569 entitled MICROELECTRONIC MEMORY KEY WITH RECEPTACLE AND SYSTEMS THEREFOR issued to William P. Flies on Oct. 27, 1981 and assigned to the same assignee as the present invention, relates generally to such systems. It is specifically concerned with electrical key-like devices which carry data in the form of microelectronic circuit components. Electrical connection of a computer system or the like is established with the key-like device by inserting the device into a specially designed electrical receptacle in which the key-like device is turned to establish direct connection between electrical contacts on its surface and electrical contacts in the receptacle which communicate with the operating system to which the receptacle is connected. The subject matter of the patent is incorporated herein by reference.

This invention is concerned generally with such portable insertion devices and such operating systems. However, it is specifically concerned with electrical tag-like devices or other shaped insertion devices and electrical receptacles specifically adapted to receive such insertion devices and establish electrical contact therewith by simple straightforward insertion into the receptacle with the aid of a simple pushing motion to lock the insertion device into a contact position in the receptacle without the need for a key-like turning motion to accomplish this end. This is generally referred to as bayonet-type insertion.

Such bayonet-type insertion devices are preferably flat taglike devices although a wide variety of other shapes may be utilized. When the term "tag" is utilized herein, it is to be taken as referring to the wide variety of insertion devices generally possible within the framework of this invention and not merely to substantially flat taglike devices, although the latter type and associated receptacle represent the preferred embodiment of the invention.

Likewise, the receptacle may be connected electrically to a wide variety of various operating systems. The electrical system with which the receptacle is typically used will take the form of a computer, that is, an electrical circuit means including a program memory and a processor.

The insertion devices utilized with the receptacle described herein include exposed electrical contacts which mate with electrical contacts in the receptacle. The insertion device contacts originate inside the body of the insertion device where they are connected to an electrical circuit element such as a microelectronic chip or the like. Such microelectronic circuit elements may comprise random access memory devices of the EPROM (erasable programmable memory), ROM (read only memory), PROM (programmable read only memory) and EAROM (electrically alterable read only memory) or a magnetic domain memory such as bubble memory may all be used depending upon the specific overall system design desired.

The insertion devices described hereinabove provide relatively large amounts of data bit storage with very fast access time and in a very durable medium. They not only serve to store data and introduce it into a computer or other electrical control system, but also provide portability for electronic circuit elements and stored information. The receptacle described herein is a critical element in interconnecting the insertion device with the electrical control system with which it is intended to cooperate.

SUMMARY OF THE INVENTION

The electrical receptacle of the invention is designed to accept the insertion and thereby establish the connection of portable microelectronic memory, data storage circuits and the like to computers and other electrical operating systems. The design of the receptacle facilitates the application of such insertion devices as portable devices.

The electrical receptacle is actuated by insertion of a portable insertion article, a tag herein, carrying electrical contacts. The receptacle comprises a housing or the like; article support means in the housing for receiving and holding the inserted article; actuator means including abutment means positioned in the housing so as to be contacted and actuated by pushing on the inserted article; a receptacle contact carrier assembly including receptacle electrical contacts, the assembly being mounted in the housing for movement therein; means actuably connecting the carrier assembly to the actuator means such that when an insertion article is inserted into the article support means and urged against the actuator abutment means it causes movement of the carrier assembly to bring the electrical contacts thereon into engagement with the electrical contacts on the inserted article. The receptacle also includes means for establishing electrical connection between an electrical operating system and the receptacle electrical contacts whereby electrical communication can be established between the electrical operating system and the inserted article.

BRIEF DESCRIPTION OF THE DRAWINGS

FIG. 2 is a pictorial view of the receptacle of the invention and a tag insertion device oriented for insertion into the receptacle through a slot formed in the housing for this purpose.

FIG. 3 is a pictorial view of the receptacle of the invention showing the tag insertion device inserted into the receptacle but not pushed into its actuating and locked position.

FIG. 4 is a pictorial view of the receptacle of the invention similar to that shown in FIG. 5 further showing the tag insertion device fully inserted into the receptacle and pushed into its actuating or locked position.

FIG. 5 is a vertical cross-section taken along line 5—5 of FIG. 3.

FIG. 6 is a vertical cross-section taken along line 6—6 of FIG. 5.

FIG. 7 is a vertical cross-section taken along line 7—7 of FIG. 4.

FIG. 8 is a vertical cross-section taken along line 8—8 of FIG. 7.

FIG. 9 is a sectional plan view taken along line 9—9 of FIG. 5.

FIG. 10 is a fragmentary bottom sectional plan view taken along line 10—10 of FIG. 7.

DESCRIPTION OF THE PREFERRED EMBODIMENT

Figure 1:
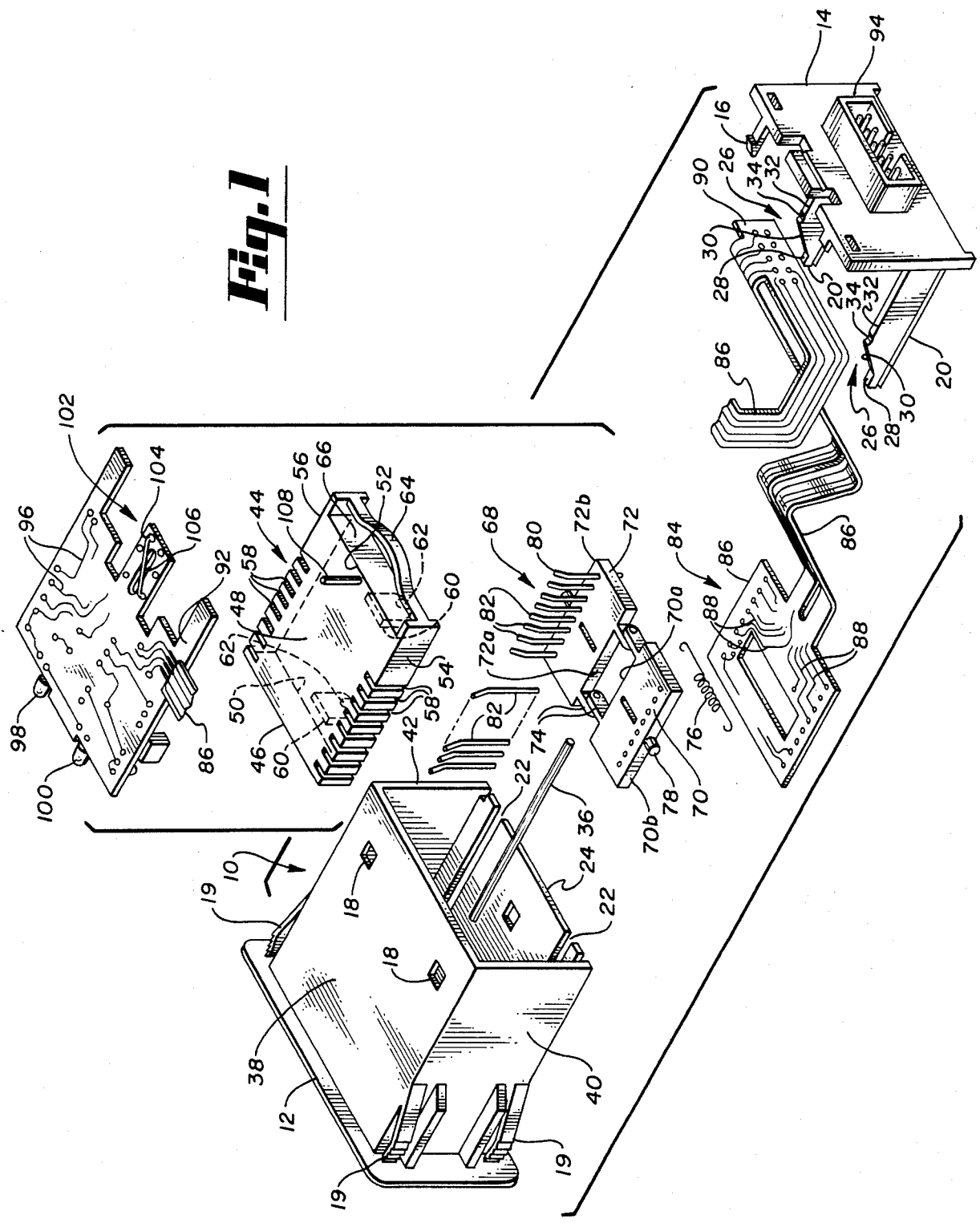
FIG. 1 is a pictorial exploded view of the receptacle of the invention with extension lines added to show orientation and relationship of the various illustrated component elements or members.

Referring now to the drawings, and particularly to FIG. 1, the various elements of the receptacle are shown in relative exploded view. The receptacle is comprised of a non-conductive housing 10 including a front bezel 12 and a rear closure member 14 which may be fitted into housing 10 and locked into position by means of locking tabs 16 (only one shown) which engage suitably positioned openings 18 in the housing. Rear closure member 14 carries a pair of spaced longitudinally extending rail members 20 which are slidably received in slots 22 in floor 24 of housing 10 when the closure member is inserted into the housing and locked into position therein. Each of the rails 20 carries at its end and on the upper surface thereof a camming surface generally designated at 26 which includes a lower portion 28 and a ramp portion 30 which rises upwardly to an elevated portion 32 having a detent notch 34 formed therein.

An elongated support pin or shaft 36 is carried inside housing 10, the opposite ends of which are supported by closure member 14 and bezel 12 (not shown) in any suitable manner so as to suspend shaft 36 intermediate the floor 24 and the top 38 and intermediate the sides 40 and 42 of housing 10. Shaft 36 functions as a support for the movable parts of the receptacle, providing a sliding and rotary surface therefor.

The first movable part of the receptacle comprises a tag support generally indicated at 44 which functions to receive an inserted tag device through its open end 46 as will be described further hereinbelow. Tag support 44 is preferably formed from non-conductive plastic into a sleeve-like receiver as shown which is shaped to conform to the overall shape of the insertion device to be used, a tag in this instance. Preferably, the insertion device will be of a tag-like shape which is substantially flat and rectangular whereby tag support 44 will be likewise shaped as shown in a substantially flat and rectangular sleeve-like member having a closed top 48, a closed bottom 50, the open end 46 and a closed inner end 52. The opposite side walls 54 and 56 each include a series of spaced lateral openings or slots 58 which function to expose the electrical contacts of the inserted tag-like device and to receive the receptacle electrical contacts and for establishing contact between the receptacle contacts and the tag contacts as will be described further hereinbelow. Tag support 44 also includes a pair of spaced depending ear-like members 60 which terminate in curved notches 62 by means of which tag support 44 is mounted or carried on shaft 36 for sliding reciprocable movement. A spring member 64 is carried by tag support 44 at its inner end so as to abut closure member 14 when tag support 44 is reciprocated inwardly in housing 10 upon insertion of a tag device and pushing it or urging it against inner end wall 66 which acts as an abutment surface for the inserted tag. Spring member 64 is preferably formed of plastic such as Delrin ® 500 thermoplastic acetal resin available from E. I. DuPont de Nemours & Co., Wilmington, Del. 19898. However, it may be desirable in some instances that metal be used for this non-linear spring. It is preferably designed to function as a non-linear spring requiring a relatively high force to initiate reciprocable movement of tag support 44 by pushing on an inserted tag device which force changes to a low force following initial inward movement of tag support 44. This spring is designed to exhibit force displacement characteristics of the type exhibited by Belleville spring washers without the frictional losses generally associated with those springs.

When tag support 44 is appropriately mounted on shaft 36, it is superposed above a receptacle contact carrier assembly, generally indicated at 68. Assembly 68 includes a pair of contact carrier elements 70 and 72, each of which includes inwardly extending spaced members 74 by means of which carriers 70 and 72 may be slidably and rotatably carried on shaft 36 for both reciprocable movement thereon and an upward and downward swinging movement as well. The relative spacing of members 74 and 76 with respect to tag support 44, support members 60 is such that members 60 are farther apart than members 74 so that members 74 are enclosed by members 60 on shaft 36.

Contact carriers 70 and 72 are interconnected by means of spring member 76 which extends therebetween underneath the contact carriers as is best seen in FIGS. 6 and 8. The contact carriers also include a pair of cam followers 78 and 80 which are arranged to coact with camming ramps 26 as is described further hereinbelow. A plurality of upstanding electrical contact pins 82 are also carried along the outside edges of the upper surfaces of contact carriers 70 and 72.

The bases of contact pins 82 are contacted underneath carriers 70 and 72 by electrical circuit means generally designated 84 which is comprised of a flexible plastic substrate 86 such as Kapton ® polyimide film available from E. I. DuPont de Nemours & Co., Wilmington, Del. 19898. Substrate 86 carries printed circuit means (in the known manner) indicated at 88 for connection to the contact pins 82 and which extends within housing 10 to other areas such as a pin contact area 90 and an upper printed circuit board area 92. Pin contact area 90 is adapted for connection to an electrical pin contact which extends outwardly from closure member 14 (not shown) at 94 in known manner for establishing plug-in contact with an electrical operating circuit (not shown).

As already indicated, the flexible circuit means 86 also extends to an upper printed circuit board at 92 which also includes printed circuit means indicated at 96 which provides circuitry associate with a LOFO switch and circuitry which operates a pair of signal lights. The circuit board may also include additional circuit elements and functions as may be desired. As shown, the board includes a pair of signal lights 98 and 100 which are suitably exposed through bezel 12. For example, light 98 may be red and light 100 may be green and may be electrically connected into the printed circuit board to signal a green light when the receptacle is electrically operable and awaiting insertion of a tag-like device. The red light 100 may be connected into the circuit so as to signal normal operation of the system when a tag-like device has been inserted and latched into the operating position.

Also as shown, master switch of the LOFO type (last on-first off) is also preferably included on printed circuit board 92 and generally indicated at 102. This LOFO switch is best seen in FIG. 10 and includes a pair of crossed wire members 104 and 106 which are suitably interconnected into the electrical circuit so as to allow its electrical activation and operation when wire members 104 and 106 are shorted together as by upright pin 108 which is carried by tag support 44 so as to provide reciprocable movement of pin 108 between the two positions shown in FIG. 10. As a LOFO switch, this arrangement provides for the switch to be activated as the last electrical contact made when a tag device is fully placed in the latched-in position and the receptacle is ready to be placed into operation. Likewise, the LOFO switch is the first switch to be opened so as to deactivate the entire electrical circuit in the receptacle before any other contacts therein are broken upon removal of an inserted tag device from the fully latched-in position. A switch arrangement which is normally closed and which opens to indicate a tag is in place may also be used.

Referring now specifically to FIG. 2, a receptacle housing 10 is shown as seen from the front showing a full view of bezel 12 including a slot opening 110 which is of a shape particularly designed to receive the tag insertion device generally indicated at 112. Tag insertion device 112 is introduced into receptacle housing 10 by inserting it through slot 110.

Tag device 112 may, for example, preferably be of the type shown in co-pending application Ser. No. 477,905, entitled PORTABLE ELECTRONIC INFORMATION DEVICES AND METHOD OF MANUFACTURE, filed in the names of William P. Flies and William H. Wehrmacher and assigned to the same assignee as is the present invention. The tag device is of the type which includes a non-conductive plastic body 114 and an embedded electrical circuit component such as a microelectronic memory chip or the like as already previously referred to hereinabove (not shown). Electrical connection is made to the embedded electronic component by means of electrical contacts 116 which are seated at the base of a plurality of slot distributed along the edges of tag body 114 as can be seen in the Figure. Tag contacts 116 mate with receptacle contacts 82 when the tag has been inserted into receptacle housing 10 and pushed to the "latched-in" position.

FIG. 3 shows tag 112 introduced into housing 10 through slot 110 but not yet pushed into the fully "latched-in" position. FIG. 4 shows tag 112 pushed into the "latched-in" position in housing 10. When referring to the two positions of the inserted tag hereinbelow, the position shown in FIG. 3 will be referred to as the "inserted" position and the position as shown in FIG. 4 will be referred to as the "latched-in" position. FIGS. 3, 5, 6, 9 (solid line) and 10 (phantom line) show the positions of the various movable elements of the receptacle when a tag is in the "inserted" position and the receptacle has not been activated either mechanically or electrically. FIGS. 4, 7, 8, 9 (phantom line) and 10 (solid line) show the various movable components of the receptacle when tag 112 has been pushed into the "latched-in" position.

As can be seen in FIGS. 3, 5, 6, 9 (solid line) and 10 (phantom line) when tag 112 is in the "inserted" position, cam followers 78 and 80 rest at the lower surface 28 of camming surfaces 26. Consequently, receptacle contact carriers 72 and 70 are in a low position in housing 10 such that receptacle contact pins 82 merely rest in slots 58 of tag support 44 and are angled slightly outwardly with respect thereto. In such a position, no contact exists between receptacle contact pins 82 and tag contacts 116 as can be seen with reference to FIG. 6 in which a portion of tag 112 at the left side of the Figure has been removed to clearly show contact 116.

Receptacle contacts 82 are positioned and configured such that they, along with spring 76 and spring 64 cooperate to provide an inherently spring-loaded force which normally places the movable parts of the receptacle in the "inserted" position in all cases except when a tag has been inserted and pushed to the fully latched-in position at which time the additional spring force generated between contact pins 82 and the tag contacts 116 along with seating of cam followers 78 and 80 in notches 34 on the upper camming surface tend to hold the moving parts of the receptacle in the "latched-in" position so long as the tag is present in tag support 44 after having been pushed into the "latched-in" position.

Once a tag 112 has been inserted into receptacle housing 10 and pushed to the "latched-in" position, the movable parts of the receptacle assume the positions shown in FIGS. 4, 7, 8, 9 (phantom line) and 10 (solid line). It can be seen from these Figures that when tag 112 is pushed inwardly into receptacle housing 10, its abutment against end wall 66 overcomes spring 64 thereby allowing reciprocable movement of tag support 44 inwardly on shaft 36. This inward movement causes corresponding inward movement of tag carriers 70 and 72 causing cam followers 78 and 80 to ride upwardly on camming surfaces 26 along ramps 30 and onto upper camming surfaces 32 where they find a resting position in notches 34. This movement causes an upward swinging movement of carriers 70 and 72 accompanied by an inward movement of contact pins 82 whereby contact is established with tag contacts 116 as best seen in FIG. 8 (a portion of tag 112 in the left side of the Figure having been removed for clearly showing contact 116). This motion also increases the tension on spring 76 which urges the tag carriers to their normal lower position. However, this force is not enough to alone overcome the spring force generated when contact pins 82 are brought into contact with tag contacts 116 and cam followers are seated in notches 34. In order to return to the more normal "inserted" position the additional force of a pull on tag 112 is required.

The camming ramp shape is so designed as to provide a spring-like coaction. Four elements cooperate to obtain a latched-in operating position in the receptacle. (1) the non-linear spring; (2) the non-linear retention spring between the contact carriers, (3) the ramp shape and (4) the contacts themselves are springs. Thus, if no tag is used but a stick or the like is inserted, the contacts are not deflected, therefore, no latch-in occurs and the tag carrier merely returns to rest position.

The preferred embodiment has been specifically described herein.

It will be understood that various changes may be made in the form, construction and arrangement of the several parts described herein without departing from the spirit and scope of the invention and hence it is not to be limited to the details shown or described herein except as the same are included in the claims or may be required by disclosures of the prior art.

Having described the invention, the exclusive rights and privileges claimed are defined below:

1. An electrical receptacle, actuated by insertion of a device carrying electrical contacts, which comprises:
    a housing;
    article support means in the housing for receiving and holding the inserted device;

actuator means including abutment means positioned in the housing so as to be contacted by the inserted device;

a receptacle contact carrier assembly including electrical contacts, the assembly being swingably and reciprocably mounted in the housing;

means actuably connecting the carrier assembly to the actuator means such that a device inserted into the device support means and urged against the actuator abutment means causes reciprocable movement of the carrier assembly and swinging movement of the electrical contacts thereon into engagement with the electrical contacts on the inserted device, and means for establishing electrical connection to the receptacle electrical contacts.

2. The receptacle of claim 1 including biasing means associated with the actuator means such that the actuator means biases the receptacle contact carrier assembly to resist movement.

3. The receptacle of claim 1 including camming surface means and cam follower means associated with the receptacle contact carrier assembly for imparting the swinging motion thereto upon reciprocable motion of the carrier assembly.

4. The receptacle of claim 1, wherein the device support means and the receptacle contact carrier assembly are superposed relative to each other, each being elongated and extending into the receptacle housing, and wherein the contact carrier assembly comprises contact support means carrying an array of electrical contact pins, the pins being arranged thereon so as to coincide with the contacts on the device to be inserted and extending toward the device support means, and means are included for mounting the contact support means for swinging movement toward and away from the device support means whereby the receptable contacts may be moved into contact with those on a device inserted into the receptacle and supported on the device support means.

5. The receptacle of claim 4, including camming surface means adjacent the contact support means and extending into the receptacle, and cam follower means associated with the contact support means for reciprocating movement therewith and disposed for coaction with the camming surface means, the camming surface means being so shaped that, as the contact support means reciprocates inwardly with the cam follower means upon insertion of the device, the cam follower means is elevated on the camming surface means whereby a swinging motion is imparted to the contact support means to move the contacts thereon toward the device support means.

6. The receptacle of claim 5, wherein the contact support means comprises:

a pair of contact support members disposed adjacent each other, the members having inner mutually adjacent portions and oppositely disposed outer portions, the adjacent inner portions and the outer portions being aligned to extend inwardly into the receptacle, the contacts being disposed along the outer portions;

elongated pivot means extending inwardly of the receptacle and disposed between the inner adjacent portions of the contact support members;

means pivotally mounting the adjacent inner portions of the contact support members on the pivot means whereby the outer oppositely disposed portions thereof swing upwardly upon inward movement of the support members into the receptacle.

7. The receptacle of claim 6, including means extending between the pair of contact support members for urging them away from the device support means.

8. The receptacle of claim 6, wherein the camming surface means comprises first and second camming surfaces disposed adjacent the oppositely disposed outer portions of the support members respectively and the cam follower means comprises first and second cam followers carried by the oppositely disposed outer portions of the support members, respectively for coaction with the respective camming surfaces.

9. The receptacle of claim 8, wherein the camming surfaces include upper detents for receiving the cam followers whereby the receptacle contacts may be retained in an upper position.

10. The receptacle of claim 6, wherein the device support means is reciprocably mounted in the housing for reciprocable movement with the contact support means and comprises an elongate sleeve-like receiver extending into the receptacle and includes a plurality of spaced openings extending along the opposite elongate edges thereof to expose similarly spaced contacts on an inserted device and the receptacle contact pins extend respectively into the spaced openings for retention guidance during movement of the pins into contact with the device contacts.

11. The receptacle of claim 10, wherein the sleeve-like receiver includes a closed inner end which functions as the abutment means.

12. The receptacle of claim 11, including means extending between the closed inner end of the receiver and the housing for urging the receiver outwardly against inward pushing force.

13. The receptacle of claim 12, wherein the urging means comprises a spring.

14. The receptacle of claim 13, wherein the spring is a leaf spring.

15. The receptacle of claim 13, wherein the spring is non-linear.

16. The receptacle of claim 10, wherein the article receiver is slidably mounted on the elongate pivot means and the actuator means cooperates between the device receiver and the pair of contact support members to effect the respective motion thereof upon insertion of an article into the receptacle.

17. The receptacle of claim 10, including LOFO receptacle switch means operably associated with the actuator means and the electrical connection means.

18. An electrical receptacle, actuated by insertion of a substantially flat tag having electrical contacts on opposite edges thereof, the receptacle comprising:

a housing;

tag receiving and support means carried by the housing and shaped so as to receive and support the tag upon insertion with the edges thereof and the contacts thereon disposed laterally;

means mounting the tag receiving and support means in the housing for reciprocable movement therein upon insertion of a tag between a normal "inserted" position and an inwardly "latched-in" position;

means urging the tag receiving and support means to the normal "inserted" position;

a printed circuit board carried in the housing above the tag receiving and support means;

elongated sliding and pivot means carried in the housing and disposed below the tag receiving and support means and extending longitudinally with respect thereto;

a pair of receptacle contact support members disposed adjacent each other and below the tag receiving and support means, the members having inner mutually adjacent portions mounted on the elongated pivot means for sliding and rotational movement of the members thereon and also having oppositely disposed outer portions aligned to extend inwardly into the receptable coextensively with the contact carrying edges of a tag inserted into the tag receiving and support means;

means connecting the contact support members to the tag receiving and support means for reciprocable movement therewith by sliding along the sliding and elongated pivot means when the tag receiving and support means is moved between the "inserted" and "latched-in" positions;

first and second camming surfaces respectively disposed in the housing adjacent the oppositely disposed outer portions of the contact support members and extending longitudinally within the receptacle;

first and second cam follower means respectively carried by the contact support members, respectively for reciprocating motion therewith along the camming surfaces, the camming surfaces being so shaped that, as the contact support members reciprocate between the normal "inserted" position and the inward "latched-in" position, the cam followers are respectively raised and lowered on the camming surfaces whereby a swinging motion is imparted to the contact support members, particularly the outer portions thereof;

receptacle contact pins carried along the outer portions of the contact support members and extending upwardly therefrom to the tag receiving and support means whereby they move upwardly and inwardly when the support members reciprocate inwardly and swing upwardly;

means extending between the contact support members urging them to the normal "inserted" position and downwardly away from the tag receiving and support means;

electrical input means;

electrical connection means interconnecting the bases of the contact pins on the support members, the electrical input means and the printed circuit board.

19. The receptacle of claim 18, wherein the urging means associated with the tag receiving and support means comprises a non-linear spring.

20. The receptacle of claim 18, wherein the tag receiving and support means comprising a sleeve-like structure having a closed inner end for abutment with an inserted tag and including lateral openings for exposing the tag contacts to the receptacle contacts.

21. The receptacle of claim 20, wherein the openings comprise a plurality of openings on each side of the sleeve-like structure.

22. The receptacle of claim 18, including means mounting the tag receiving and support means on the elongated sliding and pivot means for sliding reciprocable movement therein.

23. The receptacle of claim 22, wherein the mounting means comprises a pair of spaced, depending support ears.

24. The receptacle of claim 23, including a pair of spaced inwardly projecting ears on each of the inner adjacent portions of the contact support members connecting same to the elongated sliding and pivot means, the ears of the sleeve-like structure being forward and rearward, respectively, of the support member ears.

25. The receptacle of claim 18, wherein the upper ends of the receptacle contact pins are turned outwardly.

26. The receptacle of claim 18, wherein the camming surfaces include detents for locking the tag receiving and support means and the support members in the inward "latched-in" position.

27. The receptacle of claim 18, including LOFO switch means cooperatively carried by the printed circuit board and the tag receiving and support means structure.

28. The receptacle of claim 18, including flexible circuit means extending between the contact support members and also extending to the electrical input means.

29. The receptacle of claim 28, wherein the printed circuit board is electrically connected to the input means.

* * * * *